Dec. 20, 1960 A. C. LUTHER, JR 2,965,705

KINESCOPE BACKGROUND CONTROL SYSTEM

Filed Aug. 21, 1957 2 Sheets-Sheet 1

INVENTOR.
Arch C. Luther, Jr.
BY
[signature]
ATTORNEY.

Dec. 20, 1960 A. C. LUTHER, JR 2,965,705

KINESCOPE BACKGROUND CONTROL SYSTEM

Filed Aug. 21, 1957 2 Sheets-Sheet 2

INVENTOR.
Arch C. Luther, Jr.
BY
[signature]
ATTORNEY.

United States Patent Office 2,965,705

Patented Dec. 20, 1960

2,965,705

KINESCOPE BACKGROUND CONTROL SYSTEM

Arch C. Luther, Jr., Merchantville, N.J., assignor to Radio Corporation of America, a corporation of Delaware Filed Aug. 21, 1957, Ser. No. 679,486

16 Claims. (Cl. 178—5.4)

Figure 1:
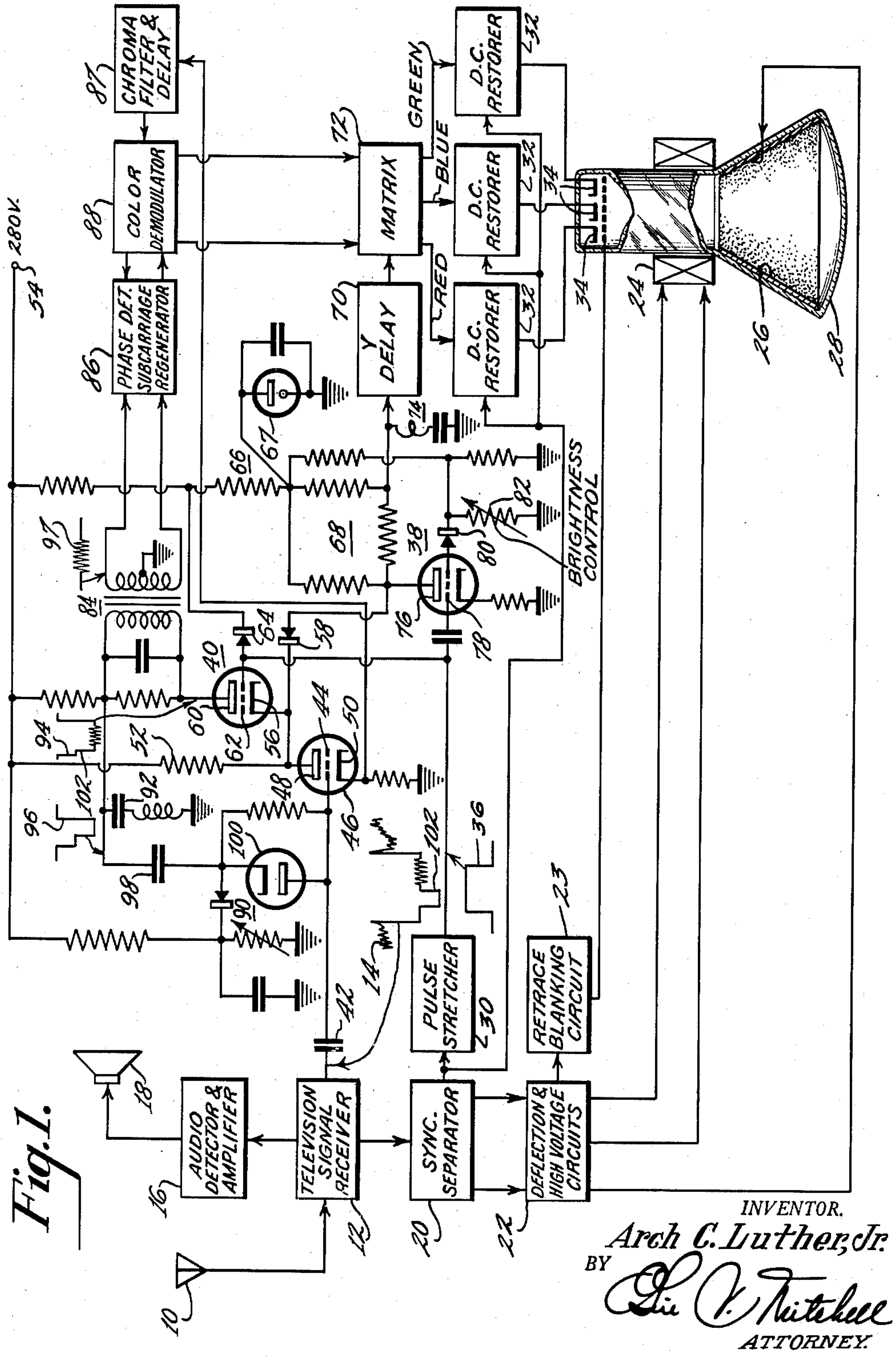

This invention relates to a color television receiving system for restoring the direct current component of a television signal and, more particularly, to a background control circuit which simplifies the chrominance and luminance channels and facilitates color balancing in a color television receiving system.

In present television practice, the image of a scene to be televised is projected onto a suitable pickup device which develops electric wave signals represented by light values of elementary areas of the picture image. These signals are transmitted to a signal device, which may include non-conductive coupling means, for translating the signal to the image reproducing device. Since the light variations are reproduced to a brightness level as represented by the direct current component of the signal, it is necessary that the signal be referred to that reference level. Where such signal is passed through a coupling device, for example, a capacitor or an equivalent device, the direct current component must be effectively restored. Perhaps the most common example of direct current (D.C.) restoration is that which is ordinarily provided at the input electrode of the television receiver image reproducing device, usually known as a kinescope.

In accordance with existing television broadcasting standards, the scanning in the receiving apparatus is synchronized with that of the transmitting apparatus by the transmission of synchronizing signals at both a line and field rate which are superimposed on blanking pedestals during recurring retrace intervals. The blanking pedestals are ordinarily established at some arbitrary predetermined picture signal level, usually this level corresponds to black which in turn is usually made to correspond to the cutoff level of the kinescope.

In view of the necessity for restoring the D.C. component and for setting the conduction level of the image reproducing devices, many proposals have been made for accomplishing such D.C. restoration. Among the various arrangements presently known, there is the keyed clamping circuit, an example of which is disclosed in U.S. Patent No. 2,299,945, issued October 27, 1952, to K. R. Wendt. This keyed clamp arrangement, and others in the known art, afford excellent means of securing the desired results. However, even with the keyed clamp, the problem of D.C. restoration is not fully solved in the field of color television.

In color television receivers (and monitors), the usual keyed clamp technique, of clamping to the end portion, or "back porch," of the horizontal synchronizing pulse to provide the proper black level setting for kinescope cutoff, becomes more difficult since in color television a color reference burst signal appears at this "back porch." One solution which has been employed in color television to overcome this difficulty is to provide a gating circuit in the chrominance channel to eliminate the burst frequency signal so that it will not be demodulated and result in signals during the blanking interval which would interfere with D.C. restoration. Such solution, although generally satisfactory, has some less desirable features.

For example, in a color television receiver or monitor the chrominance and luminance signals are separately processed in chrominance and luminance channels respectively, and then recombined in a matrix to yield red, blue and green video signals at a level suitable for driving the kinescope. In order to maintain the greatest stability in a color television receiver or monitor it is desirable that the respective chrominance and luminance channels be kept as short and as simple as possible. To this end, it is desirable to reduce the number of operations which would normally be provided independently in these channels. It is, therefore, apparent that the above solution of providing a gating circuit in the chrominance channel is not entirely satisfactory. Furthermore, some systems may require substantial amplification in this channel as well as means to shut this channel off for color killer operation.

It is therefore an object of this invention to provide an improved system for direct current restoration in a color television system.

Another object of this invention is to provide an improved color television black level direct current restoration circuit which eliminates the need for removal of the color television burst frequency signal.

An additional object of this invention is to provide an improved color television system which more accurately maintains the gain and phase of the signals in the luminance and chrominance channels.

Still another object of this invention is to provide improved burst gating, simplified color balancing, and feedback stabilized direct current restoring circuits.

A further object of this invention is to provide brightness control in a color television system which is independent of color balance.

A still further object of this invention is to provide an improved keyed black level direct current restoration circuit which also separates the reference color burst frequency signal from the synchronizing pulse.

These objects are achieved in accordance with this invention by first separating the composite video television signal into its luminance and chrominance components. A clipping circuit in the luminance channel removes the synchronizing pulses and the "back porch" color reference burst frequency signal. A brightness control circuit operating upon the luminance channel replaces the synchronizing and color burst frequency signals by a variable height pedestal. The variable pedestal is available in the decoded signal for clamping and direct current restoration in the kinescope drive amplifiers. Such clamping (on the variable height pedestal) occurs in the time position formerly occupied by the synchronizing pulses. Thus the presence or absence of the demodulated color burst from the chrominance channel is immaterial.

By controlling the brightness signal in the luminance channel the tracking problem (maintaining color balance) is simplified. Tracking is assured simply by setting the gains of the video amplifiers driving the matrix so that the picture is true monochrome for any setting of the brightness control. The chrominance channel is simplified since the gating circuit formerly required to remove the color burst is no longer needed.

In another feature of the invention, the keying circuit associated with the clipping circuit not only aids in clipping, but simultaneously provides black level direct current restoration and color burst gating. The gated color burst signal has sufficient power to drive a phase detector which may control the frequency of the color sub-carrier regenerator. The circuit which is direct current restored also separates the chrominance signal from the luminance signal.

Figure 2:
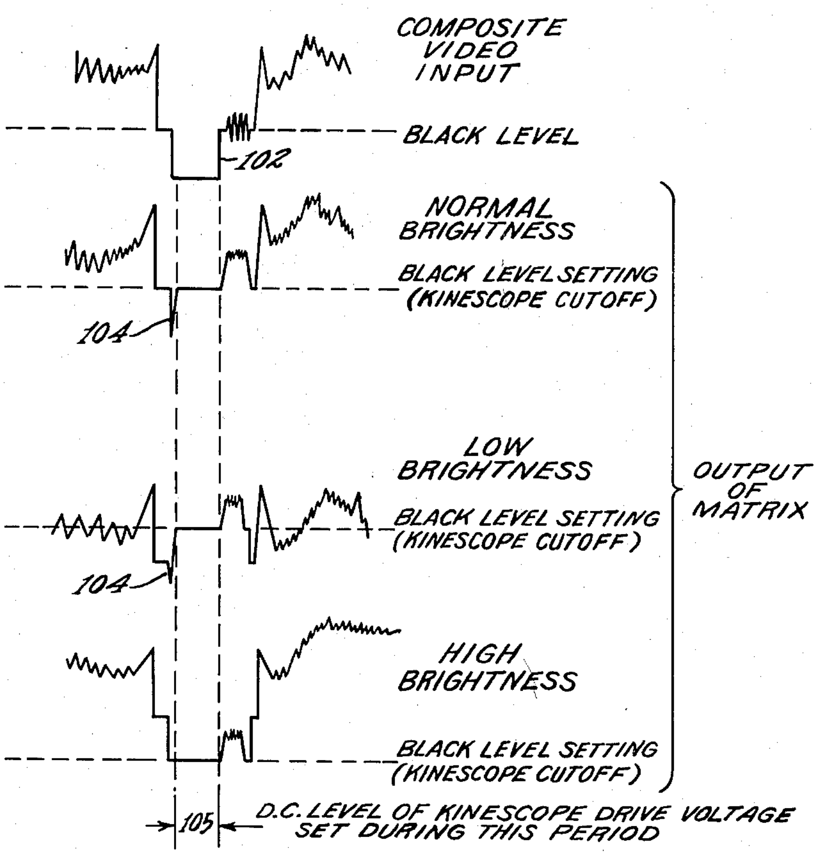

Other objects and advantages of the present invention will be apparent on a reading of the following detailed description and an inspection of the accompanying drawings in which:

Figure 1 is a partial block and partial schematic diagram of a color television system according to the invention; and Figure 2 is a graphical illustration of the effect of varying the brightness control setting of Figure 1.

Referring now to Figure 1, a color television receiver employing the present invention is illustrated. An incoming signal from the broadcast transmitter is received at the antenna 10 and applied to the television signal receiver 12. In the television signal receiver 12 the incoming signal is subjected to the first detector, intermediate frequency amplification, and second detection. The output of the television signal receiver 12 is a demodulated composite color television signal waveform 14 which also is illustrated in Figure 2 as the composite video input having a negative black reference level. This demodulated composite signal includes the picture deflection synchronizing signals, the luminance signal, the chrominance signal and the color synchronizing burst placed on the back porch of the horizontal frequency synchronizing signals.

Although illustrated in a television signal receiver, it is noted that the invention may also find use in a color television monitor wherein the composite input signal 14 is applied directly to the input of the monitor from the necessary terminal equipment.

The demodulated color television signal also includes a frequency modulated sound carrier which is transmitted 4.5 megacycles removed from the picture carrier. An audio detector amplifier 16 demodulates the sound information from the color television signal by use of, for example, an intercarrier sound circuit. With subsequent amplification by the audio amplifier 16, the sound information is applied to a loudspeaker 18.

The composite television signal is also applied to the synchronizing signal separator circuits 20 in which the horizontal and vertical synchronizing pulses are separated. Both the horizontal and vertical synchronizing pulses are applied to the deflection and high voltage circuits 22 which drive the color yokes 24. The deflection circuits 22 are also coupled to a retrace blanking circuit 23 which provides retrace blanking signals to the grid of the color kinescope 28. The deflection and high voltage circuits 22 also utilize the deflection synchronizing signals to generate a high voltage which is applied to the ultor 26 of the color kinescope 28. The horizontal output from the synchronizing signal separator (sync separator) circuit 20 is applied simultaneously to a pulse stretcher circuit 30 and to each of the red, blue and green direct current restorers and amplifiers 32. The direct current restorers and amplifiers 32 drive the cathodes 34 of the color kinescope 28. The pulse stretcher 30 stretches the horizontal synchronizing pulse by integration such that a separate stretched output pulse 36 results covering the time interval normally occupied by both the horizontal synchronizing pulse and the color burst frequency. As will be described below, this separate output pulse 36 is employed to gate and key a brightness control tube 38 and an error detecting and burst gate 40.

The composite video signal 14 is coupled through a coupling capacitor 42 to the grid 44 of an input amplifier and signal separator tube 46.

The input amplifier tube 46 has a plate 48 and a cathode 50. The plate 48 of the input amplifier 46 is coupled through a plate load resistor 52 to a source of B+ potential 54, to the cathode of a clipper diode 58, and to the cathode 56 of the error detector and burst gate tube 40. The error detecting and burst gate tube 40 also has a plate 60 and a control grid 62. The control grid 62 of the error detector and burst gate tube 40 is coupled through the anode of a clamping diode 64 to a point on a voltage divider 66 associated with the source of B+ potential 54. The voltage divider 66 is stabilized by a voltage regulator 67.

The anode of the clipper diode 58, which is connected in series with the luminance channel (considering the luminance channel as beginning at the plate 48 of the amplifier 46), is coupled through the matching resistance pad 68 to a luminance channel delay circuit 70 and thence to a matrix 72 which, as will be described below, combines the luminance signal with the demodulated color difference signals to provide the three color signals red, blue and green to the D.C. restorers and amplifiers 32. A trap circuit 74 tuned to the frequency of the color subcarrier (3.58 megacycles) serves to remove the color subcarrier and some of its sideband components from the luminance channel. Also, coupled to the anode of the clipper diode 58 is the plate 76 of the brightness control tube 38. The brightness control tube 38 also includes a control electrode 78 which is coupled through the anode of a diode 80 to a tap on the voltage divider 66. A potentiometer 82 is coupled between this tap on the voltage divider 66 and ground to provide a variable setting for the brightness control tube 38 as is described below.

The output (plate 60) of the error detecting and burst gate tube 40 is coupled through a circuit 84 tuned to the frequency of the color subcarrier (3.58 megacycles) which circuit in turn drives a phase detector and sub-carrier regenerator 86. The phase detector and sub-carrier regenerator 86 is coupled in a well known manner with demodulator 88 which demodulates the chrominance signal obtained from the cathode 50 of the input amplifier 46. The color difference signals from the demodulator 88 are coupled to the matrix 72.

The output of the error detector and burst gate tube 40 also drives a feedback black level clamp circuit 90 of the type described in the copending application Serial No. 472.021, filed November 30, 1954, now U.S. Patent No. 2,863,943, and assigned to the assignee of the present invention. A trap 92 coupled to the output circuit of the error detector and burst gate 40 tuned to the color sub-carrier frequency of 3.58 megacycles removes the color burst signal as is illustrated by the two waveforms 94 and 96. The waveform 94 includes the color burst signal and the waveform 96, following the trap circuit 92, shows that the color burst signal is eliminated. The transformer 84 tuned to the color subcarrier frequency of 3.58 megacycles transfers only the color burst signal, illustrated by waveform 97, to the phase detector 86.

The feedback clamping circuit couples the waveform 96 through a capacitor 98 and a diode 100 to the input of amplifier 46 at a point between the capacitor 42 and the control grid 44.

In operation the circuit processes a composite color television signal having a negative black level at approximately 75%, of the peak negative amplitude of the horizontal synchronizing pulses as is illustrated, for example, in the top drawing of Figure 2. From the drawing of Figure 2, it is observed that the color burst frequency appears on the "back porch" of the horizontal synchronizing pulse pedestal of the black level. When the composite signal is applied at the input control electrode 44, the input amplifier tube 46 in effect through the action of the trap 74 and the chrominance filter 87 separates the luminance signal from the chrominance signal of the composite video input 14. The chrominance signal is taken from the cathode 50 of amplifier 46 and applied through a chrominance filter 87 and appropriate delay circuit 87 to the color demodulators 88. Note that only passive circuit elements are coupled in this chrominance channel. The plate 48 of the input amplifier tube 46 drives the luminance channel through the clipper diode 58.

The error detector and burst separator tube 40 is normally non-conducting because the operating potential of the plate 48 of the input amplifier tube 46 (and, hence, the cathode 56 of tube 40) is normally more positive than the grid 62 of tube 40 as determined by the voltage divider 66. With the application to the grid 62 of the stretched horizontal pulse 36, the error detector and burst gate tube 40 is keyed on for the duration of the synchronizing signal and back porch interval. Quiescently (in the absence of a horizontal synchronizing signal), pulse 36 is at a voltage slightly negative to the cathode 56 of the gate 40. The positive level of the pulse 36 is set by the clamping diode 64 which voltage is set by voltage divider 66.

When gated on by the positive pulse 36, the error detector and burst gate tube 40 provides a current flow through the amplifier tube 46 which is equal to the signal current in the amplifier tube 46 during the blanking interval thereby cutting off the clipper diode 58. The clipper diode 58 thus removes the horizontal synchronizing pulse and the color reference burst from the composite video input 14. As illustrated by the plate waveform 94 in Figure 1, the output of the burst gate 40 contains the trailing edge 102 of the horizontal synchronizing pulse and the color reference burst, but the video signal is gated out. The transformer 84, tuned to the color subcarrier frequency, passes the color reference burst to the phase detector 86. The pulse component 96 of the waveform 94 is coupled to the feedback clamp circuit 90 which, when rectified by the diode 100, provides black level bias for the input amplifier 46. The trap circuit 92 eliminates any residual color burst information from the rectifier circuit 90 so that the bias on the input amplifier 46 is developed from the pulse output of the error detector and gate tube 40 only. As noted above, the operation of this feedback restorer circuit is described in more detail in the copending Luther application. Thus the tube 40 performs the dual function of separating the color reference burst and maintaining proper black level bias on amplifier 46. In addition, tube 40, with the aid of the clipper diode 58, removes the horizontal synchronizing signal and the color burst frequency from the composite video input 14. The color burst thus has a close phase relationship to the chrominance signals.

The stretched synchronizing pulse 36 also keys the brightness control circuit 38. The brightness control circuit 38 thus conducts for the duration of the pulse 36 and introduces a variable voltage pedestal into the luminance channel. The voltage amplitude of this variable pedestal may be varied by the adjustment of the brightness control potentiometer 82. This variable pedestal, which passes through the pad 68, Y delay 70, and the matrix 72, thus provides a reference level for subsequent clamping in the video amplifier and D.C. restorer stages 32. The video output stages 32 may, for example, include a feedback black level D.C. restorer circuit similar to circuit of tubes 46, 40, and diode 90. By keying the D.C. restorers 32 with an unstretched synchronizing pulse, clamping is effected during an interval 105 illustrated in Figure 2. Any demodulated color burst components are thus excluded from the output to the kinescope 28. The D.C. level of the kinescope drive voltage thus is set during the interval formerly occupied by the horizontal synchronizing pulse, which interval now contains the variable height pedestal.

Thus, by variation of the brightness control 82 the black level of the kinescope may be readily varied. By reference to the illustrations of Figure 2 it is noted that a normal brightness setting is obtained by inserting a brightness pedestal having an amplitude substantially identical to the black level setting of the composite video input signal. Low brightness is obtainable by introducing a larger positive pedestal such that the black level setting interval approaches the level of white picture. Conversely a higher brightness is obtained by decreasing the amplitude of the positive pedestal inserted into the luminance channel such that the black level setting interval is more negative than the level of black picture. The pip 104 observed in the waveforms in the normal brightness of Figure 2 results from the fact that the stretched pulse 36 obtained from the normal horizontal synchronizing pulse is delayed slightly and in this time interval the normal horizontal synchronizing pulse of the composite video input is allowed to pass through the luminance channel before removal by the clipping diode 58.

There has been described a simple, relatively economical system which provides means whereby direct current restoration may be accomplished at black level without requiring the removal of the color synchronizing burst from the chrominance channel. At the same time the invention provides a simplified circuit so that the gains and phases of the signals in the chrominance and luminance channels are inherently maintained by essentially passive circuits.

A clipper circuit in the luminance channel of color television system removes the synchronizing pulse and the color synchronizing burst signals from this channel and replaces them with a variable height pedestal for brightness control. Feedback black level direct current restoration is provided by the same tube which controls clipping and which simultaneously provides color burst frequency keying yielding a sufficient burst to directly drive a phase detector.

What is claimed is:

1. A signal transferring circuit arrangement including an electric wave signal translating device having an input circuit and an output circuit, a feedback clamp circuit connected between said output and said input circuit, and an electronic switching device connected between said output and said input circuit, said switching device being coupled to said clamp circuit in a manner to control its operation, means to apply pulse energy to said switching device whereby said feedback clamp circuit operates to clamp the input of said translating device to the value of said electric wave signal at the time of application of said pulse energy, and means coupled to said switching device to derive a selected frequency from said electric wave signal during the application of said pulse energy.

2. A signal transferring circuit arrangement including an electric wave signal translating device having an input circuit and an output circuit, a feedback clamp circuit and an electronic switching device serially connected between said output and said input circuit, means to apply pulse energy to said switching device thereby to clamp the input of said translating device to the value of said electric wave signal at the time of application of said pulse energy, means coupled to said switching device to derive a selected frequency from said electric wave signal during the application of said pulse energy, and means coupled to said translating device and to said switching device adapted to conduct only during the absence of said pulse energy at said switching device.

3. A signal transferring circuit arrangement including an electric wave signal translating device having an input circuit and an output circuit, a feedback clamp circuit and an electronic switching device serially connected between said output and said input circuit, means to apply pulse energy to said switching device thereby to clamp the input of said translating device to the value of said electric wave signal at the time of application of said pulse energy, means coupled to said switching device to derive a selected frequency from said electric wave signal during the application of said pulse energy, and unidirectional conducting means coupled to said translating device output circuit and to said switching device and poled such that the application of said pulse energy to said switching device blocks conduction in said unidirectional means.

4. A signal transferring circuit arrangement including an electric wave signal translating device having an input circuit and an output circuit, a feedback clamp circuit and an electronic switching device serially connected between said output and said input circuit, a source of recurring signals, means coupling said source to said switching device to apply said recurring signals to said switching device thereby to clamp the input of said translating device to the value of said electric wave signal at the time of application of said recurring signals, and means coupled to said switching device to derive a selected frequency from said electric wave signal during the application of said recurring signals, unidirectional conducting means coupled to said translating device output and poled such that the application of said recurring signals to said switching device blocks conduction in said unidirectional means, and means coupled to said unidirectional means and responsive to said recurring signals to add a pedestal of pulse energy to the output circuit of said translating device.

5. A signal transferring circuit arrangement including an electric wave signal translating device having an input circuit and an output circuit, a feedback clamp circuit and an electronic switching device serially connected between said output and said input circuit, a source of gating pulses, means coupling said source to said switching device for applying said gating pulses to said switching device such that said translating device and said switching device provide a series direct current path during the application of said gating pulses thereby to clamp the input of said translating device to the value of said electric wave signal at the time of application of said pulse energy, and means coupled to said switching device to derive a selected frequency from said electric wave signal during the application of said gating pulses, unidirectional conducting means coupled to said translating device output circuit and poled such that the application of said gating pulses to said switching device blocks conduction in said unidirectional means, means coupled to said unidirectional means and responsive to said gating pulses to add a pedestal of pulse energy on said electron wave signal, and means to vary the voltage amplitude of said pedestal.

6. A signal transferring circuit arrangement including an electric wave signal translating device having a first and a second output circuit and an input circuit, a feedback clamp circuit and an electronic switching device serially connected between said first output and said input circuit, a source of gating pulses, means coupling said source to said switching device for applying said gating pulses to said switching device, such that said translating device and said switching device provide a series direct current path during said gating pulses thereby to clamp the input circuit of said translating device to the value of said electric wave signal at the time of application of said pulse energy, and means coupled to said switching device to derive a selected frequency from said electric wave signal during the application of said gating pulses, a diode coupled to said translating device first output circuit and poled such that the application of said gating pulses to said switching device blocks conduction in said diode thereby to clip said electric wave during said gating pulses, means coupled to said diode and responsive to said gating pulses to place a pedestal of pulse energy on said electron wave signal, means to vary the voltage amplitude of said pedestal, and means coupled to said translating device second output to pass a selected frequency portion of said electric wave.

7. In a color television system for producing successive color images from a color television signal including a luminance signal, a chrominance signal, horizontal deflection synchronizing pulses and color burst frequency signals, the combination comprising, means for separating said chrominance signal from said color television signal to provide a modified color television signal, means for removing said synchronizing pulses and said color burst signal from said color television signal, a source of a variable amplitude pedestal, and means coupled to said pedestal source and responsive to said synchronizing pulses for adding said variable amplitude pedestal to said modified color television signal.

8. In a color television system for producing successive color images from a color television signal including a luminance signal, a chrominance signal, horizontal deflection synchronizing pulses and color burst frequency signals, said deflection pulses occurring during scanning retrace intervals, apparatus for adjusting image background comprising, means for separating said luminance signal, said deflection pulses, and said color burst signal from said chrominance signal, means coupled to said separating means for suppressing said synchronizing pulses and said color burst signal, a source of a variable amplitude background control signal, and means responsive to said synchronizing pulses and to said source for combining said variable amplitude signal with said luminance signal whereby the background level of said images varies with the amplitude of said background control signal.

9. In a color television receiver adapted to receive a color television signal including a luminance signal, a chrominance signal, horizontal synchronizing pulses and a color burst frequency signal, apparatus for adjusting image brightness comprising, means for separating said luminance signal, said synchronizing pulses, and said burst signal from said chrominance signal, means coupled to said separating means for suppressing said synchronizing pulses and said color burst signal, means for stretching in time said synchronizing pulse, a source of a variable amplitude brightness control signal, and means responsive to said stretching means and to said source for combining said variable amplitude pedestal with said color television signal in place of said synchronizing pulses and said burst signal, whereby the brightness level of said images varies with the amplitude of said background control signal.

10. In a color television system for producing successive color images from a color television signal including a luminance signal, a chrominance signal, horizontal synchronizing pulses and color burst frequency signals, said synchronizing pulses occurring during scanning retrace intervals, apparatus for adjusting image brightness comprising, means for separating said chrominance signal from said color television signal, means coupled to said separating means for removing said synchronizing pulses and said color burst signals from said color television signal, means for stretching said synchronizing pulses, a source of a variable amplitude pedestal, means coupled to said stretching means and to said source and responsive to said stretched synchronizing pulses for combining said variable amplitude pedestal with said color television signal in place of said synchronizing pulses and said burst signals, a color reference frequency oscillator, a frequency control circuit coupled to said oscillator and to said removing means, said removing means being adapted to selectively gate said color burst signal to said frequency control circuit.

11. In a color television system for producing successive color images from a color television signal including a luminance signal, a chrominance signal, horizontal synchronizing pulses and color burst frequency signals, said synchronizing pulses occurring during scanning retrace intervals and having an amplitude corresponding to black in said color images, apparatus for adjusting said image brightness comprising means for separating said chrominance signal from said television signal, means coupled to said separating means for removing said synchronizing pulses and said color burst signals from said color television signal, means for stretching in time said synchronizing pulses, a source of a variable amplitude pedestal signal, means coupled to said stretching means and to said source and responsive to said stretched synchronizing pulses for combining said variable amplitude pedestal signal with said color television signal in place of said synchronizing pulses and said burst signals, a color reference oscillator and frequency control circuit, said removing means being coupled to said oscillator and control circuit and being adapted to selectively gate said color burst signal to said frequency control circuit, said removing means also including means responsive to said synchronizing pulses for clamping the direct current level of said color television signal to the black level of said synchronizing pulses whereby said removing means simultaneously provides directing current reinsertion and color burst signal gating.

12. In a color television monitor adapted to receive a video color television signal including a luminance signal, a chrominance signal, horizontal synchronizing pulses and color burst frequency signals, said monitor including a luminance channel, a circuit for controlling image brightness comprising a signal translating device having an input circuit and an output circuit, said input circuit being connected to receive said color television signal, a control electron flow device having a common circuit electrode connection to the output circuit of said signal translating device and an input circuit electrode to which gating pulses are applied, a brightness control electron flow device having an output circuit electrode connected to said luminance channel, and a control electrode, and a unidirectional conducting device coupled between the output of said signal translating device and said brightness control device output electrode.

13. In a color television monitor adapted to receive a video color television signal including a luminance signal, a chrominance signal, horizontal synchronizing pulses and color burst frequency signals, said monitor including a luminance channel, a circuit for controlling image brightness comprising a signal translating device having a control electrode and an output electrode, said control electrode being connected to receive said color television signal, means to extend the time base of said synchronizing pulses over the time interval occupied by said synchronizing pulses and said color burst to provide gating pulses, a controlled electron flow device having a common circuit electrode connection to the output electrode of said signal translating device, an input circuit electrode connected to said extending means and an output circuit, a brightness control electron device having an output circuit electrode connected to said luminance channel and a control electrode, a diode coupled between the output circuit of said signal translating device and said brightness control device output electrode, and poled to conduct in the absence of said gating pulses, thereby to suppress said synchronizing pulses and said color burst signals from said luminance channel, said extending means being also coupled to said brightness device control electrode whereby said synchronizing pulses and color burst which have been removed from said luminance channel are replaced by a variable amplitude pedestal for varying the brightness of said images.

14. The components set forth in claim 13 wherein said monitor includes a chrominance channel and said signal translating device includes a second output electrode coupled to said chrominance channel, said chrominance channel including only passive circuit elements.

15. A pulsed feedback clamping and frequency information separation arrangement for a video frequency wave amplifying circuit having input and output leads and a capacity coupling device connected to said input lead, said arrangement including a controlled electron flow path device having a common circuit electrode connected to said output lead, a control electrode to which a train of pulses of reference amplitude is applied, and an output electrode, a unilateral impedance device having a cathode coupled by a capacitor to said output electrode and an anode connected to the input lead of said video signal translating device at the connection to said capacity coupling device, a frequency selective circuit, the output electrode of said controlled electron flow path device also being connected to said frequency selective circuit whereby said frequency information is separated from said pulse information and whereby the input lead of said video amplifying circuit is clamped to a value dependent on said separated pulse information.

16. The arrangement set forth in claim 15, also including a brightness control system having an input coupled to the output lead of said video amplifying circuit, said brightness control system comprising a unidirectional conducting device coupled between said brightness control system input and output and a brightness controlled electron flow device having an input connected to receive said train of pulses and an output connected to the output lead of said brightness control system at the connection to said unidirectional conducting device whereby a variable height pulse is applied at the output of the brightness control system upon the occurrence of each of said pulses.

References Cited in the file of this patent

UNITED STATES PATENTS 2,712,568 Avins ------------------ July 5, 1955
2,744,155 Kihn ------------------ May 1, 1956

UNITED STATES PATENT OFFICE
CERTIFICATION OF CORRECTION

Patent No. 2,965,705 December 20, 1960

Arch C. Luther, Jr.

It is hereby certified that error appears in the above numbered patent requiring correction and that the said Letters Patent should read as corrected below.

Column 10, list of references cited, after line 47, add the following:

2,877,296 Dennison et al.-----------Mar. 10, 1959

Signed and sealed this 20th day of June 1961.

(SEAL)

Attest:

ERNEST W. SWIDER
Attesting Officer

DAVID L. LADD
Commissioner of Patents